US012633458B2

(12) United States Patent
Yamaguchi

(10) Patent No.: US 12,633,458 B2
(45) Date of Patent: May 19, 2026

(54) MULTILAYER CERAMIC CAPACITOR AND METHOD FOR PRODUCING THE SAME

(71) Applicant: Murata Manufacturing Co., Ltd., Nagaokakyo (JP)

(72) Inventor: Shinichi Yamaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 30 days.

(21) Appl. No.: 18/596,740

(22) Filed: Mar. 6, 2024

(65) Prior Publication Data

US 2025/0226154 A1 Jul. 10, 2025

Related U.S. Application Data

(62) Division of application No. 17/870,879, filed on Jul. 22, 2022.

(30) Foreign Application Priority Data

Aug. 6, 2021 (JP) ................................. 2021-129466

(51) Int. Cl.
  *H01G 4/12* (2006.01)
  *H01G 4/012* (2006.01)
  *H01G 4/30* (2006.01)
(52) U.S. Cl.
  CPC ............. *H01G 4/1227* (2013.01); *H01G 4/30* (2013.01); *H01G 4/012* (2013.01)

(58) Field of Classification Search
  CPC ......... H01G 4/30; H01G 4/1227; H01G 4/012
  USPC ........................ 361/301.4, 311, 321.1, 321.4
  See application file for complete search history.

(56) References Cited

U.S. PATENT DOCUMENTS

| | | | |
|---|---|---|---|
| 2002/0171066 A1* | 11/2002 | Venigalla .......... | C04B 35/62894 252/573 |
| 2017/0287639 A1* | 10/2017 | Choi ........................ | H01G 4/30 |
| 2020/0194178 A1* | 6/2020 | Choi ...................... | H01G 4/248 |

OTHER PUBLICATIONS

Yamaguchi, "Multilayer Ceramic Capacitor and Method for Producing the Same", U.S. Appl. No. 17/870,879, filed Jul. 22, 2022.

* cited by examiner

*Primary Examiner* — Arun Ramaswamy
(74) *Attorney, Agent, or Firm* — Keating & Bennett, LLP

(57) ABSTRACT

A multilayer ceramic capacitor includes a multilayer body including dielectric layers, inner-electrode layers, and outer electrodes coupled to the inner-electrode layers. The multilayer body includes Ba, Ti, Ca, Mg, Zr, and R, and when the Ti content is defined as 100 parts by mole, the relative amounts are as follows: Ca, 0.03 parts by mole or more and 0.15 parts by mole or less, Mg, 0.01 parts by mole or more and 0.09 parts by mole or less, R, 2.5 parts by mole or more and 8.4 parts by mole or less; Zr, 0.05 parts by mole or more and 3.00 parts by mole or less: Si, 0.5 parts by mole or more and 4.0 parts by mole or less; and P, 0.005 parts by mole or more and 0.500 parts by mole or less. Ca is in a vicinity of the center of crystal grains contained in the dielectric layers.

2 Claims, 2 Drawing Sheets

MULTILAYER CERAMIC CAPACITOR AND METHOD FOR PRODUCING THE SAME

CROSS REFERENCE TO RELATED APPLICATIONS

This application claims the benefit of priority to Japanese Patent Application No. 2021-129466 filed on Aug. 6, 2021. The entire contents of this application are hereby incorporated herein by reference.

BACKGROUND OF THE INVENTION

1. Field of the Invention

The present invention relates to a multilayer ceramic capacitor and a method for producing a multilayer ceramic capacitor.

2. Description of the Related Art

Multilayer ceramic capacitors have been made primarily of $BaTiO_3$ compounds to achieve high relative permittivity. In particular, using $(BaCa)TiO_3$, a compound derived by replacing a portion of Ba with Ca, used in the dielectric layers, a component of a multilayer ceramic capacitor, provides the multilayer ceramic capacitor with good high-temperature operating life combined with good capacitance-temperature characteristics.

In recent years, however, the thickness of the dielectric layers (thickness of devices) have become increasingly smaller as multilayer ceramic capacitors have been used in smaller and higher-capacity electronics. The strength of electric fields applied to devices, therefore, is on a steady rise, making reliability of design even more challenging than before.

A possible solution to this is dielectric ceramic compositions, prepared by doping dielectric materials with certain amounts of elements. One such dielectric ceramic composition is disclosed in Japanese Unexamined Patent Application Publication No. 2005-194138 includes a dielectric ceramic composition represented by the composition formula: $100(Ba_{1-x}Ca_x)_mTiO_3+aMnO+bV_2O_5+cSiO_2+dRe_2O_3$ (where Re is at least one metal element selected from Y, La, Sm, Eu, Gd, Tb, Dy, Ho, Er, Tm, and Yb, and a, b, c, and d denote relative amounts by mole), where x, m, a, b, c, and d are respectively in the following ranges: $0.030 \leq x \leq 0.20$, $0.990 \leq m \leq 1.030$, $0.010 \leq a \leq 5.0$, $0.050 \leq b \leq 2.5$, $0.20 \leq c \leq 8.0$, and $0.050 \leq d \leq 2.5$.

Multilayer ceramic capacitors including dielectric layers made with the dielectric ceramic composition disclosed in Japanese Unexamined Patent Application Publication No. 2005-194138 exhibit good reliability in high-temperature operation, but on the other hand, tend to vary in lifetime in high temperature loading tests because an applied strong electric field (e.g., 30 kV/mm) causes electric field localization due to uneven dissolution of the dopant(s) (rare-earth element(s)). Their shortest time to failure, therefore, can be short initially.

SUMMARY OF THE INVENTION

Preferred embodiments of the present invention provide multilayer ceramic capacitors that each achieve better reliability in high-temperature operation even if a strong electric field is applied, and methods for producing such multilayer ceramic capacitors.

A multilayer ceramic capacitor according to a preferred embodiment of the present invention includes a multilayer body including a stack of multiple dielectric layers, multiple inner-electrode layers in the multilayer body, alternating with the dielectric layers, and a pair of outer electrodes on a surface of the multilayer body, electrically coupled to a portion of the inner-electrode layers exposed on the surface of the multilayer body, wherein the dielectric layers include Ba, Ti, Ca, Mg, R, and Zr, R includes at least one of Y, La, Sm, Eu, Gd, Tb, Dy, Ho, Er, Tm, or Yb, when a Ti content is defined as 100 parts by mole, Ca defines about 0.03 parts by mole or more and about 0.15 parts by mole or less, Mg defines about 0.01 parts by mole or more and about 0.09 parts by mole or less, R defines about 2.5 parts by mole or more and about 8.4 parts by mole or less, Zr defines about 0.05 parts by mole or more and about 3.00 parts by mole or less, Si defines about 0.5 parts by mole or more and about 4.0 parts by mole or less, and P defines about 0.005 parts by mole or more and about 0.500 parts by mole or less, and Ca is provided in a vicinity of a center of crystal grains included in the dielectric layers.

A method according to a preferred embodiment of the present invention for producing a multilayer ceramic capacitor that includes a multilayer body including a stack of multiple dielectric layers, multiple inner-electrode layers in the multilayer body, alternating with the dielectric layers, and a pair of outer electrodes on a surface of the multilayer body, electrically coupled to a portion of the inner-electrode layers exposed on the surface of the multilayer body, the method including preparing a base powder primarily including a perovskite compound including Ba and Ti, preparing a Ca compound, a Mg compound, and a compound of R as sources of minor ingredients Ca, Mg, and R, respectively, obtaining a mixed powder and then a ceramic slurry by mixing the base powder with the Ca compound as a source of Ca, the Mg compound as a source of Mg, and the compound of R as a source of R, obtaining dielectric sheets from the ceramic slurry, obtaining an unfired multilayer body by stacking the dielectric sheets, a subset of the dielectric sheets including an applied electrically conductive paste for inner electrodes thereon, and a obtaining the multilayer body by firing the unfired multilayer body, wherein when a Ti content of the elements is defined as 100 parts by mole, relative amounts of elements are as follows: Ca, about 0.03 parts by mole or more and about 0.15 parts by mole or less, Mg, about 0.01 parts by mole or more and about 0.09 parts by mole or less, R, about 2.5 parts by mole or more and about 8.4 parts by mole or less, Zr, about 0.05 parts by mole or more and about 3.00 parts by mole or less, Si, about 0.5 parts by mole or more and about 4.0 parts by mole or less, and P, about 0.005 parts by mole or more and about 0.500 parts by mole or less.

For a multilayer ceramic capacitor according to a preferred embodiment of the present invention, the amounts of ingredients in the formulation composition of the ceramic feedstock used to make its dielectric layers are such that the relative amounts of elements when the Ti content is defined as 100 parts by mole are as follows: Ca, about 0.03 parts by mole or more and about 0.15 parts by mole or less, Mg, about 0.01 parts by mole or more and about 0.09 parts by mole or less; R, about 2.5 parts by mole or more and 8.4 parts by mole or less, Zr, about 0.05 parts by mole or more and about 3.00 parts by mole or less, Si, about 0.5 parts by mole or more and about 4.0 parts by mole or less, and P, about 0.005 parts by mole or more and about 0.500 parts by mole or less. Since the dopant P reduces the melting point and the viscosity of the Si-based glass, the increase in the amount of heat during firing (firing temperature and the duration of firing) is limited despite the high rare earth content. This helps control the thinning of the dielectric layers resulting from sintering-induced growth of the metal particles forming the inner-electrode layers (spheroidization of the inner electrodes). Overall, the capacitor has high relative permittivity combined with improved high-temperature operating life.

A method according to a preferred embodiment of the invention for producing a multilayer ceramic capacitor, furthermore, provides a process to produce the above-described multilayer ceramic capacitor according to the present invention.

Preferred embodiments of the present invention provide multilayer ceramic capacitors are each achieve better reliability in high-temperature operation even if a high strength is applied, and methods for producing such multilayer ceramic capacitors.

The above and other elements, features, steps, characteristics and advantages of the present invention will become more apparent from the following detailed description of the preferred embodiments with reference to the attached drawings.

DETAILED DESCRIPTION OF THE
PREFERRED EMBODIMENTS

Preferred embodiments of the present invention are described below with reference to the drawings.

1. Multilayer Ceramic Capacitor

Figure 1:
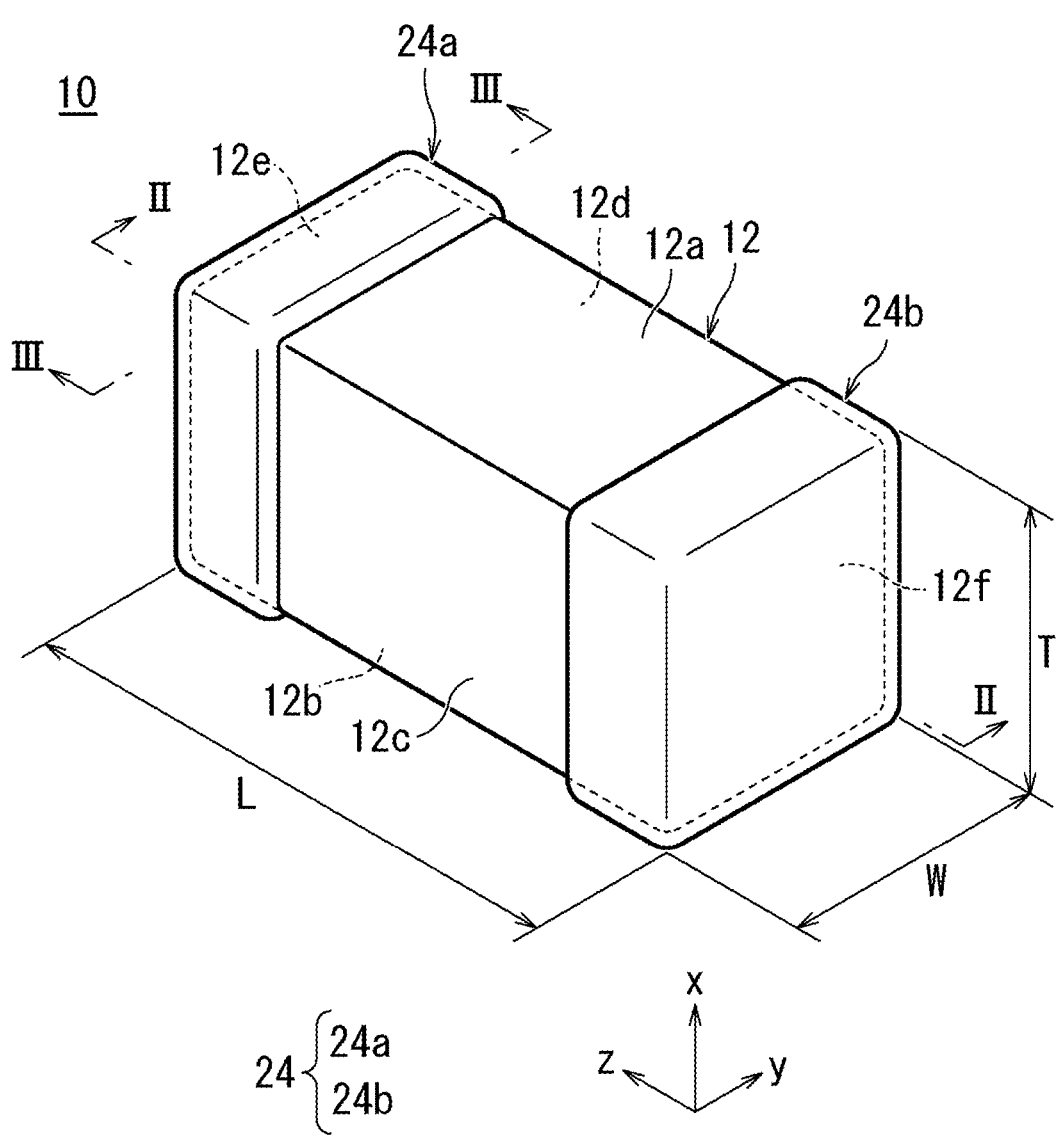
FIG. 1 is an external perspective view of an example of a multilayer ceramic capacitor according to a preferred embodiment of the present invention.
Figure 2:
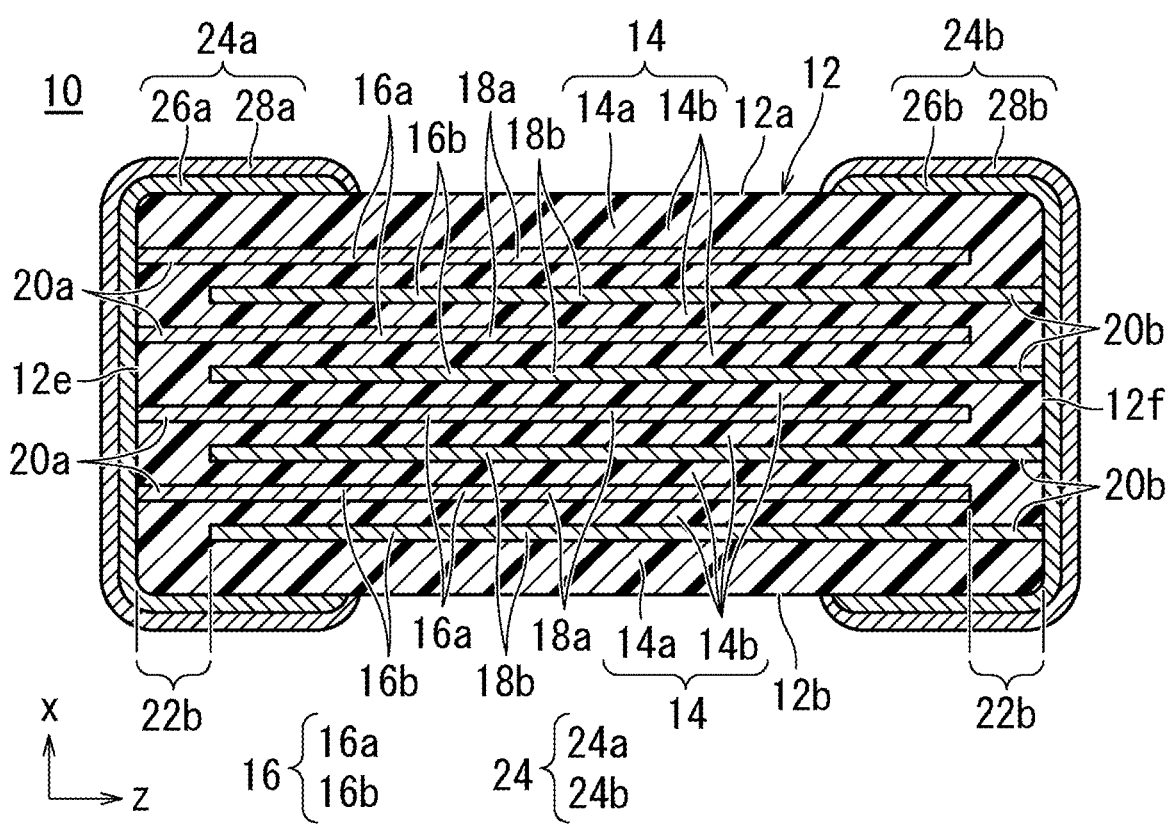
FIG. 2 is a cross-sectional view along line II-II in FIG. 1, illustrating a multilayer ceramic capacitor according to a preferred embodiment of the present invention.

The following describes multilayer ceramic capacitors according to preferred embodiments of the present invention. FIG. 1 is an external perspective view an example of a multilayer ceramic capacitor according to a preferred embodiment of the present invention. FIG. 2 is a cross-sectional view along line II-II in FIG. 1, illustrating a multilayer ceramic capacitor according to a preferred embodiment of the present invention, and FIG. 3 is a cross-sectional view along line III-III in FIG. 1, illustrating a multilayer ceramic capacitor according to a preferred embodiment of the present invention.

Figure 3:
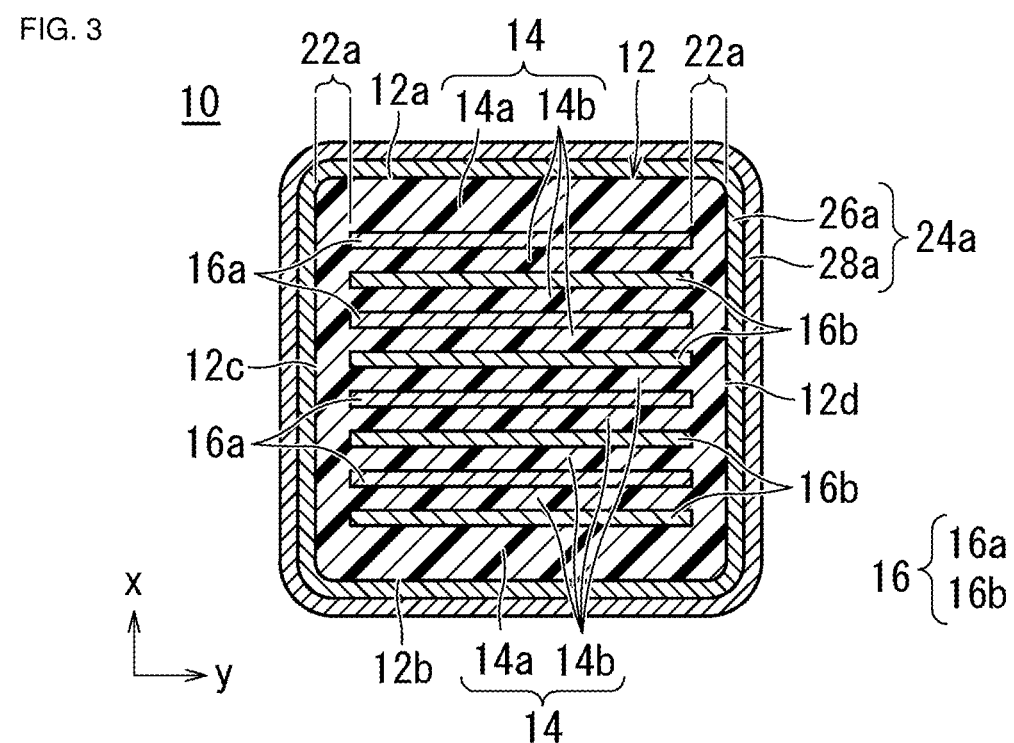
FIG. 3 is a cross-sectional view along line III-III in FIG. 1, illustrating a multilayer ceramic capacitor according to a preferred embodiment of the present invention.

As illustrated in FIGS. 1 to 3, the multilayer ceramic capacitor 10 includes a cuboid multilayer body 12.

The multilayer body 12 includes a stack of multiple dielectric layers 14 and multiple inner-electrode layers 16. The multilayer body 12, furthermore, includes a first primary surface 12a and a second primary surface 12b opposite each other in the stacking direction x, a first lateral surface 12c and a second lateral surface 12d opposite each other in the width direction y, perpendicular or substantially perpendicular to the stacking direction x, and a first end surface 12e and a second end surface 12f opposite each other in the length direction z, perpendicular or substantially perpendicular to the stacking and width directions x and y. The multilayer body 12 includes rounded corners and edges. The corners are the portions at which three adjacent surfaces of the multilayer body meet, and the edges are the portions at which two adjacent surfaces of the multilayer body meet. The first and second primary surfaces 12a and 12b, the first and second lateral surfaces 12c and 12d, and the first and second end surfaces 12e and 12f may include irregularities, for example, on a portion of them or their entirety. The dimension in the length direction z of the multilayer body 12, furthermore, is not necessarily greater than that in the width direction y.

The number of dielectric layers 14 in the stack, including the outer layers described below, is not specifically limited. The number varies with the size of the multilayer body. Specifically, it is preferable that, for example, the number of dielectric layers 14 in the stack be 50 or more and 2000 or less, and more preferably 100 or more and 1000 or less, including the outer layers described below.

The dielectric layers 14 of the multilayer body 12 include outer layers 14a and inner layers 14b. The outer layers 14a are on the first primary surface 12a and second primary surface 12b sides of the multilayer body 12 and include the dielectric layer 14 between the first primary surface 12a and the inner-electrode layer 16 closest to the first primary surface 12a and the dielectric layer 14 between the second primary surface 12b and the inner-electrode layer 16 closest to the second primary surface 12b. In the region sandwiched between the outer layers 14a are the inner layers 14b. Preferably, the thickness of the outer layers 14a is, for example, about 10 μm or more and about 200 μm or less.

The dielectric layers 14 can be made of, for example, a dielectric material. This dielectric material is, for example, a perovskite compound including Ba, Ti, Ca, Mg, Zr, and R.

Ca is provided in a vicinity of the center of the crystal grains defining the dielectric layers 14.

R may include one of rare-earth elements Y, La, Sm, Eu, Gd, Tb, Dy, Ho, Er, Tm, and Yb or may include multiple ones of them.

In the dielectric layers 14, the relative amounts of elements when the Ti content is defined as 100 parts by mole are, for example, as follows: Ca, about 0.03 parts by mole or more and about 0.15 parts by mole or less, Mg, about 0.01 parts by mole or more and about 0.09 parts by mole or less, R, about 2.5 parts by mole or more and about 8.4 parts by mole or less, Zr, about 0.05 parts by mole or more and about 3.00 parts by mole or less, Si, about 0.5 parts by mole or more and about 4.0 parts by mole or less, and P, about 0.005 parts by mole or more and about 0.500 parts by mole or less.

More preferably, the relative amount of P is, for example, about 0.210 parts by mole or more and about 0.500 parts by mole or less. It should be noted that the amount of R is a total amount; if multiple Rs are included, the total amount of R represents the sum of the numbers of parts by mole of the multiple R elements.

An example of a perovskite compound including Ba, Ti, and Ca is a perovskite compound that is a barium titanate ceramic material and is represented by general formula $A_mBO_3$. The element in the A site is Ba, optionally with at least one selected from the group consisting of Sr and Ca included with Ba. The element in the B site is Ti, optionally with Zr included with Ti. O represents oxygen. m denotes a molar ratio between the A and B sites.

The dielectric layers 14 are ceramic layers including a Ba- and Ti-including perovskite compound and other, minor ingredients. The minor ingredients included are R and Mg. The form of existence of the minor ingredients in the dielectric layers 14 is not critical. For example, the minor ingredients may be present inside the crystal grains of the perovskite compound. Specifically, it is more preferable that the crystal grains are particles including a core and a shell around it, the core being a mass of the Ba- and Ti-including perovskite compound and the shell formed by the minor ingredients being dissolved there.

The minor ingredients, furthermore, may be present at grain boundaries and/or triple junctions in the form of, for example, oxides.

By analyzing the structure of the multilayer body 12 by XRD, and it can be determined that the primary ingredient in the dielectric layers 14 has a perovskite structure of barium titanate.

The number of parts by mole of each element, which is the quantity determined by dissolving the multilayer body 12 using a solvent, processing the resulting solution, and analyzing the processed solution by ICP (inductively coupled plasma emission spectroscopy), does not depend on where the element is present inside the multilayer body 12. That is, another form of the multilayer ceramic capacitor of the present invention is one for which the composition of the multilayer body 12 is specified in the same way as that of the dielectric layers 14, described above.

Yet another form of the multilayer ceramic capacitor of the present invention is one for which the numbers of parts by mole of elements are those in a solution prepared by dissolving the multilayer body 12 using a solvent and are specified in the same way as those in the dielectric layers 14, described above. An example of a method for obtaining the solution is alkali fusion.

By grinding the multilayer body 12, slicing the ground workpiece, and then observing ten crystal grains under a TEM, the presence of Ca can be checked by EDX in a vicinity of the center of the crystal grains. This revealed that the relative amount of Ca per 100 parts by mole of Ti varied slightly from grain to grain. Given that Ca is detected in all crystal grains, however, the crystal grains confirmed to be made primarily of barium calcium titanate.

Preferably, the thickness of fired dielectric layers 14 is, for example, about 0.4 μm or more and about 3.0 μm or less. If the thickness of the dielectric layers 14 exceeds about 3.0 μm, the advantages of the present invention are diminished.

The thickness of the dielectric layers 14 is measured as follows.

First, a cross-section perpendicular or substantially perpendicular to the length direction z is exposed by grinding the multilayer body 12, and this cross-section is observed under a scanning electron microscope. Then the thickness is measured along a total of five lines, including the midline parallel or substantially parallel to the stacking direction, i.e., the line passing in that direction through the middle or approximate middle of the cross-section of the multilayer body 12, and two equally or approximately equally spaced lines on each side of the midline. Averaging the five measurements provides the thickness of the dielectric layers 14. Taking the above five measurements in upper, middle, and lower portions in the stacking direction and averaging the measurements would give a more accurate average thickness of the dielectric layers 14.

The multilayer body 12 includes multiple first inner-electrode layers 16a and multiple second inner-electrode layers 16b, for example, having a rectangular or substantially rectangular shape, as the multiple inner-electrode layers 16. The multiple first and multiple second inner-electrode layers 16a and 16b are embedded in the multilayer body 12, alternating and equally or approximately equally spaced apart in the stacking direction x.

The first inner-electrode layers 16a include a first facing electrode portion 18a, where the layers face the second inner-electrode layers 16b, and a first extended electrode portion 20a, which is at an end of the first inner-electrode layers 16a and connects the first facing electrode portion 18a to the first end surface 12e of the multilayer body 12. An end of the first extended electrode portion 20a extends to, and is exposed on, the first end surface 12e.

The second inner-electrode layers 16b include a second facing electrode portion 18b, where the layers face the first inner-electrode layers 16a, and a second extended electrode portion 20b, which is at an end of the second inner-electrode layers 16b and connects the second facing electrode portion 18b to the second end surface 12f of the multilayer body 12. An end of the second extended electrode portion 20b extends to, and is exposed on, the second end surface 12f.

The multilayer body 12 includes side portions 22a between an end in the width direction y of the first and second facing electrode portions 18a and 18b and the first lateral surface 12c and between the other end in the width direction y of the first and second facing electrode portions 18a and 18b and the second lateral surface 12d (hereinafter also referred to as the "W gaps"). The multilayer body 12, furthermore, includes end portions 22b between the end of the first inner-electrode layers 16a opposite the first extended electrode portions 20a and the second end surface 12f and between the end of the second inner-electrode layers 16b opposite the second extended electrode portions 20b and the first end surface 12e (hereinafter also referred to as the "L gaps").

The inner-electrode layers 16 include any suitable electrically conductive material, such as a metal, e.g., Ni, Ag, Pd, or Au, or an alloy including at least one such metal. The inner-electrode layers 16 may further include dielectric particles having a composition of the same series as the ceramic material included in the dielectric layers 14.

Preferably, the thickness of the inner-electrode layers 16 is, for example, about 0.2 μm or more and about 2.0 μm or less. The number of inner-electrode layers 16 is not particularly limited.

The thickness of the inner-electrode layers 16 is measured as follows.

First, a cross-section perpendicular or substantially perpendicular to the length direction z is exposed by grinding the multilayer body 12, and this cross-section is observed under a scanning electron microscope. Then the thickness is measured along a total of five lines, including the midline parallel or substantially parallel to the stacking direction, i.e., the line passing in that direction through the middle or approximate middle of the cross-section of the multilayer body 12, and two equally or substantially equally spaced lines on each side of this midline. Averaging the five measurements gives the thickness of the inner-electrode layers 16. Taking the above five measurements in upper, middle, and lower portions in the stacking direction and averaging the measurements would provide a more accurate average thickness of the inner-electrode layers 16.

On the first end surface 12e and second end surface 12f sides of the multilayer body 12 are outer electrodes 24. The outer electrodes 24 include a first outer electrode 24a and a second outer electrode 24b.

The first outer electrode 24a is on the first end surface 12e of the multilayer body 12, and extends from the first end surface 12e to cover a portion of the first primary surface 12a, the second primary surface 12b, the first lateral surface 12c, and the second lateral surface 12d. This makes the first outer electrode 24a electrically coupled to the first extended electrode 20a of the first inner-electrode layers 16a. The first outer electrode 24a may be provided only on the first end surface 12e of the multilayer body 12.

The second outer electrode 24b is on the second end surface 12f of the multilayer body 12, and extends from the second end surface 12f to cover a portion of the first primary surface 12a, the second primary surface 12b, the first lateral surface 12c, and the second lateral surface 12d. This makes the second outer electrode 24b electrically coupled to the second extended electrode 20b of the second inner-electrode layers 16b. The second outer electrode 24b may be provided only on the second end surface 12f of the multilayer body 12.

Inside the multilayer body 12, the first facing electrode portions 18a, of the first inner-electrode layers 16a, and the second facing electrode 18b, of the second inner-electrode layers 16b, face each other with dielectric layers 14 therebetween, thus creating electrostatic capacities. This provides an electrostatic capacity between the first and second outer electrodes 24a and 24b, to which the first and second inner-electrode layers 16a and 16b, respectively, are coupled, enabling the multilayer body 12 to define and function as a capacitor.

The first outer electrode 24a includes a first base electrode layer 26a and a first plating layer 28a on the surface of the first base electrode layer 26a. Similarly, the second outer electrode 24b includes a second base electrode layer 26b and a second plating layer 28b on the surface of the second base electrode layer 26b.

The first base electrode layer 26a is on the first end surface 12e of the multilayer body 12, and extends from the first end surface 12e to cover a portion of the first primary surface 12a, the second primary surface 12b, the first lateral surface 12c, and the second lateral surface 12d.

The second base electrode layer 26b, furthermore, is on the second end surface 12f of the multilayer body 12, and extends from the second end surface 12f to cover a portion of the first primary surface 12a, the second primary surface 12b, the first lateral surface 12c, and the second lateral surface 12d.

The first base electrode layer 26a may be provided only on the first end surface 12e of the multilayer body 12, and the second base electrode layer 26b may be provided only on the second end surface 12f of the multilayer body 12.

Each of the first and second base electrode layer 26a and 26b includes, for example, at least one selected from a baked layer, a resin layer, a thin-film layer, etc. The following describes first and second base electrode layers 26a and 26b defined by a baked layer.

The baked layer includes glass and metal (s). The metal(s) in the baked layer is, for example, at least one selected from Cu, Ni, Ag, Pd, Ag—Pd alloys, Au, etc. The glass in the baked layer includes, for example, at least one selected from B, Si, Ba, Mg, Al, Li, etc. There may be multiple baked layers. The baked layer(s) include(s) an electrically conductive paste including the glass and the metal(s) applied to the multilayer body 12 and baked there. The baked layer(s) may be the product of simultaneous firing with the dielectric layers 14 and the inner-electrode layers 16 or may be the product of baking after the firing of the dielectric layers 14 and the inner-electrode layers 16. Preferably, the thickness of the thickest portion of the baked layer(s) is, for example, about 5.0 μm or more and about 180 μm or less.

A resin layer may be included that includes electrically conductive particles and a thermosetting resin. If a resin layer is formed, it may be formed directly on the multilayer body 12, without a baked layer. There may be multiple resin layers.

A thin-film layer is formed by a thin-film formation technique, such as, for example, sputtering or deposition. It is, for example, an approximately 1.0-μm or thinner layer of metal particles.

The first plating layer 28a is provided over the first base electrode layer 26a. Specifically, the first plating layer 28a is on the first end surface 12e on the surface of the first base electrode layer 26a, preferably extending to the first primary surface 12a, the second primary surface 12b, the first lateral surface 12c, and the second lateral surface 12d on the surface of the first base electrode layer 26a as well. The first plating layer 28a may be provided only on the surface of the first base electrode layer 26a on the first end surface 12e.

Similarly, the second plating layer 28b is provided over the second base electrode layer 26b. Specifically, the second plating layer 28b is on the second end surface 12f on the surface of the second base electrode layer 26b, preferably extending to the first primary surface 12a, the second primary surface 12b, the first lateral surface 12c, and the second lateral surface 12d on the surface of the second base electrode layer 26b as well. The second plating layer 28b may be provided only on the surface of the second base electrode layer 26b on the second end surface 12f.

The first and second plating layers 28a and 28b (hereinafter also simply referred to as the plating layers), furthermore, are made with, for example, at least one metal selected from Cu, Ni, Sn, Pd, Ag—Pd alloys, Au, etc., or an alloy containing such metal(s).

Each plating layer may include multiple layers. In that case, it is preferred that the plating layers have a two-layer structure including a Ni plating layer and a Sn plating layer. A Ni plating layer provided over the surface of the base electrode layer helps prevent the base electrode layer from being corroded by solder when the multilayer ceramic capacitors 10 are packaged. Providing a Sn plating layer over the surface of the Ni plating layer will improve solder wettability when the multilayer ceramic capacitors 10 are packaged, thus facilitating the packaging process.

Preferably, the thickness of each individual plating layer is, for example, about 1.0 μm or more and about 10 μm or less. Preferably, furthermore, the plating layers include no glass. It is also preferred that the percentage of metals per unit volume in the plating layers is, for example, about 99% by volume or more.

The outer electrodes 24 include plating layers disposed on the multilayer body 12 and coupled directly to the inner-electrode layers 16. This may be preceded by the pretreatment of providing a catalyst on the multilayer body 12.

The dimension in the length direction z of the multilayer ceramic capacitor 10 including the multilayer body 12 and the first and second outer electrodes 24a and 24b is defined as the L dimension, that in the stacking direction x of the multilayer ceramic capacitor 10 including the multilayer body 12 and the first and second outer electrodes 24a and 24b is defined as the T dimension, and that in the width direction y of the multilayer ceramic capacitor 10 including the multilayer body 12 and the first and second outer electrodes 24a and 24b is defined as the W dimension.

Preferably, the dimensions of the multilayer ceramic capacitor 10 are, for example, as follows: the L dimension (length direction z), about 0.15 mm or more and about 3.40 mm or less; the W dimension (width direction y), about 0.08 mm or more and about 2.70 mm or less; the T dimension (stacking direction x), about 0.08 mm or more and about 2.70 mm or less.

For the multilayer ceramic capacitor 10 according to the present preferred embodiment, the amounts of ingredients in the formulation composition of the ceramic feedstock used to make the dielectric layers 14 are, for example, such that the relative amounts of elements when the Ti content is defined as 100 parts by mole are as follows: Ca, about 0.03 parts by mole or more and about 0.15 parts by mole or less; Mg, about 0.01 parts by mole or more and about 0.09 parts by mole or less; R, about 2.5 parts by mole or more and about 8.4 parts by mole or less; Zr, about 0.05 parts by mole or more and about 3.00 parts by mole or less; Si, about 0.5 parts by mole or more and about 4.0 parts by mole or less; and P, about 0.005 parts by mole or more and about 0.500 parts by mole or less. Since the dopant P reduces the melting point and viscosity of the Si-based glass, the increase in the amount of heat during firing (firing temperature and the duration of firing) is limited despite the high rare earth content. This helps control the thinning of the dielectric layers 14 resulting from sintering-induced growth of the metal particles forming the inner-electrode layers 16 (spheroidization of the inner electrodes). Overall, the capacitor has high relative permittivity combined with improved high-temperature operating life.

The multilayer ceramic capacitor 10 according to the present preferred embodiment, furthermore, has better high-temperature operating life if, for the amounts of ingredients in the formulation composition of the ceramic feedstock used to make its dielectric layers 14, the relative amount of R when the Ti content is defined as 100 parts by mole is, for example, about 5.7 parts by mole or more and about 8.4 parts by mole or less.

The multilayer ceramic capacitor 10 according to the present preferred embodiment, moreover, has improved shortest time to failure if, for the amounts of ingredients in the formulation composition of the ceramic feedstock used to make its dielectric layers 14, the relative amount of P when the Ti content is defined as 100 parts by mole is, for example, about 0.210 parts by mole or more and about 0.500 parts by mole or less.

2. Method for Producing a Multilayer Ceramic Capacitor

The following describes a method according to a preferred embodiment of the present invention for producing multilayer ceramic capacitors configured as described above and as illustrated in FIG. 1.

First, a base powder, which is a powder primarily including a perovskite compound including at least Ba and Ti, is prepared. The A site/B site ratio of the perovskite compound, whose general formula is represented by $A_mBO_3$, does not need to be stoichiometric as long as the composition falls within the scope of the present invention, but preferably is, for example, about 0.99 or more and about 1.02 or less.

For use as Ba sources, Ba compounds such as, for example, $BaCO_3$ are suitable. For use as Ti sources, Ti compounds such as, for example, $TiO_2$ are suitable.

Then the base powder, primarily including a Ba- and Ti-including perovskite compound, and a Ca compound, a Mg compound, and a compound of R as sources of minor ingredients Ca, Mg, and R, respectively, are mixed together to produce ceramic feedstock.

These compounds are blended in predetermined amounts so that the numbers of parts by mole of the elements relative to the Ti content in the multilayer ceramic capacitors of the present invention will be the amounts of the elements blended.

Possible forms of the compounds mixed in include, for example, $CaCO_3$, $MgO$, and oxides of R (e.g., $R_2O_3$).

The minor-ingredient compounds, however, can be in any suitable form. Besides an oxide powder and a powder of a carbonate, various forms of compounds can be used, including, for example, a chloride powder, sol, and metalorganic compounds.

The minor-ingredient compounds can be in any form when mixed. For example, multiple minor ingredients may be mixed together beforehand and may then be subjected to heat treatment. It is also possible to mix in a particular minor ingredient in two or more divided portions.

The resulting ceramic feedstock, and optionally an organic binder, a plasticizer, and an organic solvent added thereto, were mixed and dispersed to homogeneity, for example, using a ball mill, and the resulting dispersion was dried to provide a homogenized powder. The resulting homogenized powder is then calcined at a temperature of, for example, about 1000° C. or above and about 1200° C. or below, to produce a base powder having an average diameter of particles of, for example, about 0.2 μm.

Powders of $MgCO_3$, $R_2O_3$, $ZrO_2$, and $SiO_2$ and a P-source phosphate (dibutyl phosphate) are prepared as minor ingredients. The $R_2O_3$ powders are, for example, $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$.

Then certain amounts of the powders of $MgCO_3$, $R_2O_3$, $ZrO_2$, and $SiO_2$ and the P-source phosphate (dibutyl phosphate) are weighed out so that, for example, the Mg content will be about 0.01 parts by mole or more and about 0.09 parts by mole or less, the total R content will be about 2.5 parts by mole or more and about 8.4 parts by mole or less, the Zr content will be about 0.05 parts by mole or more and about 3.00 parts by mole or less, the Si content will be about 0.5 parts by mole or more and about 4.0 parts by mole or less, and the P content will be about 0.005 parts by mole or more and about 0.500 parts by mole or less, all per 100 parts by mole of Ti, and added to the base powder to provide a mixed powder. Although very slightly, by as small as about 0.01 parts by mole, the Zr content may increase from that in the formulation composition due to contamination from YSZ balls used in the mixing process.

Analyzing the ceramic feedstock by ICP helps ensure that the proportions of elements are within the formulation composition specified above.

For the ceramic slurry, the resulting mixed powder is wet-mixed with an organic solvent and a dispersant and dispersed to homogeneity in a ball mill, and the resulting dispersion is further mixed with a polyvinylbutyral binder and a plasticizer to provide a ceramic slurry.

Then dielectric sheets are prepared by applying the ceramic slurry to resin films.

After that, a Ni-based electrically conductive paste for inner electrodes is prepared. The binder and the solvent, which are usually included in an electrically conductive paste for inner electrodes, may be a known organic binder and a known organic solvent.

Then the electrically conductive paste for inner electrodes is applied, for example, by printing in a predetermined pattern, to the surface of the dielectric sheets, and the dielectric sheets now have an inner electrode pattern formed thereon. The application of the electrically conductive paste for inner electrodes can be by a known process, such as screen printing or gravure printing, for example.

Then a predetermined number of dielectric sheets for outer layers, with no printed inner electrode pattern thereon, are stacked, dielectric sheets with a printed inner electrode pattern thereon are stacked thereon one by one, and a predetermined number of dielectric sheets for outer layers are stacked thereon. This results in a multilayer-body sheet.

Optionally, the multilayer-body sheet is pressed in the stacking direction x, for example, with an isostatic press, thereafter. This results in a multilayer block.

After that, the multilayer-body block is cut into a predetermined shape and predetermined dimensions, and thus unfired multilayer bodies 12 are cut out that include dielectric layers and inner-electrode layers (hereinafter also referred to as multilayer-body chips). The corners and edges of the multilayer-body chips may be rounded, for example, by barrel polishing.

Then the unfired multilayer-body chips are heated in a $N_2$ atmosphere, for example, at a temperature of about 350° C. for about 3 hours, to burn the binder, and then fired at about 1200° C. for about 2 hours in a reducing atmosphere formed by a $H_2$—$N_2$—$H_2O$ gas having an oxygen partial pressure of about $10^{-9}$ MPa to about $10^{-12}$ MPa to produce sintered multilayer bodies. Dissolving these multilayer bodies and analyzing the solution by ICP helps ensure that the proportions of elements are within the formulation composition specified above, excluding Ni as a component of the inner-electrode layers.

Although very slightly, by as small as about 0.02 parts by mole, the Zr content may increase from that in the formulation composition due to contamination from YSZ balls used during the mixing process.

To form a baked layer of an outer electrode 24, for example, a Cu paste including glass frit is applied to the exposed area of the first extended electrode portions 20a, of the first inner-electrode layers 16a, exposed on the first end surface 12e of the multilayer body 12, and the applied paste is baked in a $N_2$ atmosphere. Similarly, to form a baked layer of an outer electrode 24, for example, a Cu paste including glass frit is applied to the exposed area of the second extended electrode portions 20b, of the second inner-electrode layers 16b, exposed on the second end surface 12f of the multilayer body 12, and the applied paste is baked in a $N_2$ atmosphere. Preferably, the baking temperature is, for example, about 700° C. or above and about 900° C. or below. Optionally, one or more plating layers are formed on the surface of the baked layers to complete the outer electrodes 24.

In such a way, multilayer ceramic capacitors 10 as illustrated in FIG. 1 are produced.

In the method according to the present preferred embodiment for producing a multilayer ceramic capacitor, the amounts of ingredients in the formulation composition of the ceramic feedstock for the dielectric layers 14 are such that the numbers of parts by mole of elements when the Ti content is defined as 100 parts by mole are, for example, as follows: Ca, about 0.03 parts by mole or more and about 0.15 parts by mole or less; Mg, about 0.01 parts by mole or more and about 0.09 parts by mole or less; R, about 2.5 parts by mole or more and about 8.4 parts by mole or less; Zr, about 0.05 parts by mole or more and about 3.00 parts by mole or less; Si, about 0.5 parts by mole or more and about 4.0 parts by mole or less; and P, about 0.005 parts by mole or more and about 0.500 parts by mole or less. This produces the resulting multilayer ceramic capacitor 10 with a high relative permittivity combined with long high-temperature operating life.

3. Experiment Examples

Then, to verify the advantages of the above-described method according to the present preferred embodiment for producing a multilayer ceramic capacitor, the inventor of preferred embodiments of the present invention produced multilayer ceramic capacitors following the production method of the present preferred embodiment, measured their relative permittivity, and measured their lifetime characteristics through a high temperature loading test.

First, the multilayer ceramic capacitors used as samples in the experiment examples were made using the above production method under the following conditions.

The specifications for the sample multilayer ceramic capacitors used in the experiment examples are as follows;

Size (design) of the multilayer ceramic capacitors: length×width×height=about 1.6 mm×0.8 mm×0.8 mm Material for the dielectric layers: See Tables 1 and 2

Thickness of the dielectric layers: about 1.5 μm

The number of dielectric layers stacked in the effective area: 220

Material for the inner-electrode layers: Ni

Structure of the outer electrodes

Base electrode layer: A layer of baked Cu paste

Plating layer: The two-layer structure of Ni plating and Sn plating (a) Measurement of Relative Permittivity The electrostatic capacity of the sample multilayer ceramic capacitors was measured at about 25° C. under about 1 Vrms and about 1 kHz conditions using an automatic measuring bridge. From the measured capacity, the relative permittivity was calculated. The calculated relative permittivity of each sample is presented in Tables 3 and 4. Samples with a relative permittivity of 3000 or more were rated good.

(b) Measurement of Lifetime Characteristics Through a High Temperature Loading Test A DC voltage of about 25 V was applied to 100 multilayer ceramic capacitors at about 150° C., and changes in insulation resistance were observed over time. The point in time at which the insulation resistance of the sample multilayer ceramic capacitor fell below about 10 kΩ was defined as failure. The time to failure of the 100 samples was analyzed using a Weibull plot, and the mean time to failure (MTTF) and the shortest time to failure (STTF; the time to failure of the sample that was the first to break among the 100) were determined. The determined MTTF and STTF are presented in Tables 3 and 4. Samples with an MTTF of about 30 hours or longer were good, and samples with an STTF of about 10 hours or longer were rated good.

Tables 1 and 2 include the amounts of ingredients in the formulation composition of the ceramic feedstock used to make the dielectric layers of the multilayer ceramic capacitors used as samples in the experiment examples.

Tables 3 and 4 include measured relative permittivity and measured lifetime characteristics in a high temperature loading test of the samples.

In Tables 1 to 4, the samples with an asterisked (*) number are those that were outside of the range of compositions according to preferred embodiments of the present invention.

TABLE 1

| Sample | | Parts by mole per 100 parts by mole of Ti | | | | | | |
|---|---|---|---|---|---|---|---|---|
| | No. | Ca content | Mg content | R species | R content | Zr content | Si content | P content |
| | 1 | 0.08 | 0.05 | Dy | 7.0 | 0.50 | 1.5 | 0.252 |
| * | 2 | 0.08 | 0.005 | Dy | 7.0 | 0.50 | 1.5 | 0.253 |
| | 3 | 0.08 | 0.01 | Dy | 7.0 | 0.50 | 1.5 | 0.251 |
| | 4 | 0.08 | 0.07 | Dy | 7.0 | 0.50 | 1.5 | 0.254 |
| | 5 | 0.08 | 0.09 | Dy | 7.0 | 0.50 | 1.5 | 0.252 |
| * | 6 | 0.08 | 0.13 | Dy | 7.0 | 0.50 | 1.5 | 0.250 |
| * | 7 | 0.08 | 0.05 | Dy | 2.0 | 0.50 | 1.5 | 0.255 |
| | 8 | 0.08 | 0.05 | Dy | 2.5 | 0.50 | 1.5 | 0.254 |
| | 9 | 0.08 | 0.05 | Dy | 5.0 | 0.50 | 1.5 | 0.256 |
| | 10 | 0.08 | 0.05 | Dy | 5.7 | 0.50 | 1.5 | 0.251 |
| | 11 | 0.08 | 0.05 | Dy | 8.4 | 0.50 | 1.5 | 0.258 |
| * | 12 | 0.08 | 0.05 | Dy | 8.6 | 0.50 | 1.5 | 0.257 |
| * | 13 | 0.08 | 0.05 | Dy | 7.0 | 0.03 | 1.5 | 0.258 |
| | 14 | 0.08 | 0.05 | Dy | 7.0 | 0.05 | 1.5 | 0.256 |
| | 15 | 0.08 | 0.05 | Dy | 7.0 | 1.50 | 1.5 | 0.258 |
| | 16 | 0.08 | 0.05 | Dy | 7.0 | 3.00 | 1.5 | 0.254 |
| * | 17 | 0.08 | 0.05 | Dy | 7.0 | 3.20 | 1.5 | 0.255 |
| * | 18 | 0.02 | 0.05 | Dy | 7.0 | 0.50 | 1.5 | 0.253 |
| | 19 | 0.03 | 0.05 | Dy | 7.0 | 0.50 | 1.5 | 0.252 |
| | 20 | 0.11 | 0.05 | Dy | 7.0 | 0.50 | 1.5 | 0.253 |
| | 21 | 0.15 | 0.05 | Dy | 7.0 | 0.50 | 1.5 | 0.251 |
| * | 22 | 0.16 | 0.05 | Dy | 7.0 | 0.50 | 1.5 | 0.256 |
| * | 23 | 0.08 | 0.05 | Dy | 7.0 | 0.50 | 0.4 | 0.255 |
| | 24 | 0.08 | 0.05 | Dy | 7.0 | 0.50 | 0.5 | 0.260 |
| | 25 | 0.08 | 0.05 | Dy | 7.0 | 0.50 | 2.5 | 0.238 |
| | 26 | 0.08 | 0.05 | Dy | 7.0 | 0.50 | 4.0 | 0.245 |
| * | 27 | 0.08 | 0.05 | Dy | 7.0 | 0.50 | 4.2 | 0.250 |
| * | 28 | 0.08 | 0.05 | Dy | 7.0 | 0.50 | 1.5 | 0.004 |
| | 29 | 0.08 | 0.05 | Dy | 7.0 | 0.50 | 1.5 | 0.005 |
| | 30 | 0.08 | 0.05 | Dy | 7.0 | 0.50 | 1.5 | 0.012 |
| | 31 | 0.08 | 0.05 | Dy | 7.0 | 0.50 | 1.5 | 0.053 |
| | 32 | 0.08 | 0.05 | Dy | 7.0 | 0.50 | 1.5 | 0.097 |
| | 33 | 0.08 | 0.05 | Dy | 7.0 | 0.50 | 1.5 | 0.198 |
| | 34 | 0.08 | 0.05 | Dy | 7.0 | 0.50 | 1.5 | 0.210 |
| | 35 | 0.08 | 0.05 | Dy | 7.0 | 0.50 | 1.5 | 0.360 |
| | 36 | 0.08 | 0.05 | Dy | 7.0 | 0.50 | 1.5 | 0.467 |
| | 37 | 0.08 | 0.05 | Dy | 7.0 | 0.50 | 1.5 | 0.500 |
| * | 38 | 0.08 | 0.05 | Dy | 7.0 | 0.50 | 1.5 | 0.512 |

TABLE 2

| Sample | | Parts by mole per 100 parts by mole of Ti | | | | | | |
|---|---|---|---|---|---|---|---|---|
| | No. | Ca content | Mg content | R species | R content | Zr content | Si content | P content |
| * | 39 | 0.08 | 0.05 | Y | 7.0 | 0.50 | 1.5 | 0.002 |
| | 40 | 0.08 | 0.05 | Y | 7.0 | 0.50 | 1.5 | 0.251 |
| * | 41 | 0.08 | 0.05 | Y | 7.0 | 0.50 | 1.5 | 0.515 |
| * | 42 | 0.08 | 0.05 | La | 7.0 | 0.50 | 1.5 | 0.003 |
| | 43 | 0.08 | 0.05 | La | 7.0 | 0.50 | 1.5 | 0.257 |
| * | 44 | 0.08 | 0.05 | La | 7.0 | 0.50 | 1.5 | 0.511 |
| * | 45 | 0.08 | 0.05 | Sm | 7.0 | 0.50 | 1.5 | 0.004 |
| | 46 | 0.08 | 0.05 | Sm | 7.0 | 0.50 | 1.5 | 0.261 |
| * | 47 | 0.08 | 0.05 | Sm | 7.0 | 0.50 | 1.5 | 0.503 |
| * | 48 | 0.08 | 0.05 | Eu | 7.0 | 0.50 | 1.5 | 0.003 |
| | 49 | 0.08 | 0.05 | Eu | 7.0 | 0.50 | 1.5 | 0.254 |
| * | 50 | 0.08 | 0.05 | Eu | 7.0 | 0.50 | 1.5 | 0.508 |
| * | 51 | 0.08 | 0.05 | Gd | 7.0 | 0.50 | 1.5 | 0.004 |
| | 52 | 0.08 | 0.05 | Gd | 7.0 | 0.50 | 1.5 | 0.260 |
| * | 53 | 0.08 | 0.05 | Gd | 7.0 | 0.50 | 1.5 | 0.511 |
| * | 54 | 0.08 | 0.05 | Tb | 7.0 | 0.50 | 1.5 | 0.004 |
| | 55 | 0.08 | 0.05 | Tb | 7.0 | 0.50 | 1.5 | 0.253 |
| * | 56 | 0.08 | 0.05 | Tb | 7.0 | 0.50 | 1.5 | 0.517 |
| * | 57 | 0.08 | 0.05 | Ho | 7.0 | 0.50 | 1.5 | 0.002 |
| | 58 | 0.08 | 0.05 | Ho | 7.0 | 0.50 | 1.5 | 0.255 |
| * | 59 | 0.08 | 0.05 | Ho | 7.0 | 0.50 | 1.5 | 0.514 |
| * | 60 | 0.08 | 0.05 | Er | 7.0 | 0.50 | 1.5 | 0.003 |
| | 61 | 0.08 | 0.05 | Er | 7.0 | 0.50 | 1.5 | 0.259 |
| * | 62 | 0.08 | 0.05 | Er | 7.0 | 0.50 | 1.5 | 0.509 |
| * | 63 | 0.08 | 0.05 | Tm | 7.0 | 0.50 | 1.5 | 0.003 |
| | 64 | 0.08 | 0.05 | Tm | 7.0 | 0.50 | 1.5 | 0.245 |
| * | 65 | 0.08 | 0.05 | Tm | 7.0 | 0.50 | 1.5 | 0.506 |

TABLE 2-continued

| Sample | Parts by mole per 100 parts by mole of Ti | | | | | | |
| No. | Ca content | Mg content | R species | R content | Zr content | Si content | P content |
| --- | --- | --- | --- | --- | --- | --- | --- |
| * 66 | 0.08 | 0.05 | Yb | 7.0 | 0.50 | 1.5 | 0.004 |
| 67 | 0.08 | 0.05 | Yb | 7.0 | 0.50 | 1.5 | 0.249 |
| * 68 | 0.08 | 0.05 | Yb | 7.0 | 0.50 | 1.5 | 0.514 |

TABLE 3

| | | High temperature loading test | |
| Sample No. | Relative permittivity εr | MTTF (hours) | Shortest time to failure (hours) |
| --- | --- | --- | --- |
| 1 | 3302 | 54 | 23 |
| * 2 | 3705 | 18 | 4 |
| 3 | 3260 | 45 | 20 |
| 4 | 3221 | 44 | 22 |
| 5 | 3184 | 56 | 24 |
| * 6 | 2537 | 52 | 21 |
| * 7 | 3645 | 16 | 3 |
| 8 | 3501 | 36 | 18 |
| 9 | 3420 | 41 | 20 |
| 10 | 3492 | 53 | 17 |
| 11 | 3129 | 60 | 23 |
| * 12 | 2706 | 66 | 31 |
| * 13 | 2599 | 49 | 17 |
| 14 | 3215 | 47 | 17 |
| 15 | 3286 | 51 | 20 |
| 16 | 3394 | 49 | 23 |
| * 17 | 2679 | 56 | 25 |
| * 18 | 3129 | 24 | 5 |
| 19 | 3213 | 51 | 19 |
| 20 | 3233 | 48 | 23 |
| 21 | 3287 | 55 | 20 |
| * 22 | 2690 | 46 | 22 |
| * 23 | 3200 | 48 | 5 |
| 24 | 3254 | 51 | 21 |
| 25 | 3287 | 55 | 17 |
| 26 | 3301 | 47 | 24 |
| * 27 | 3369 | 20 | 3 |
| * 28 | 3297 | 53 | 5 |
| 29 | 3290 | 51 | 13 |
| 30 | 3282 | 49 | 12 |
| 31 | 3227 | 55 | 13 |
| 32 | 3304 | 56 | 14 |
| 33 | 3299 | 51 | 14 |
| 34 | 3317 | 44 | 18 |
| 35 | 3320 | 47 | 19 |
| 36 | 3340 | 50 | 22 |
| 37 | 3356 | 51 | 21 |
| * 38 | 3403 | 25 | 5 |

TABLE 4

| | | High temperature loading test | |
| Sample No. | Relative permittivity εr | MTTF (hours) | Shortest time to failure (hours) |
| --- | --- | --- | --- |
| * 39 | 3094 | 45 | 4 |
| 40 | 3082 | 50 | 18 |
| * 41 | 3101 | 22 | 4 |
| * 42 | 3532 | 61 | 4 |
| 43 | 3561 | 61 | 25 |
| * 44 | 3602 | 24 | 3 |
| * 45 | 3525 | 59 | 5 |
| 46 | 3499 | 60 | 22 |
| * 47 | 3576 | 23 | 3 |
| * 48 | 3513 | 56 | 3 |
| 49 | 3524 | 53 | 22 |
| * 50 | 3566 | 19 | 5 |
| * 51 | 3444 | 56 | 5 |
| 52 | 3436 | 53 | 25 |

TABLE 4-continued

| | | High temperature loading test | |
| Sample No. | Relative permittivity εr | MTTF (hours) | Shortest time to failure (hours) |
| --- | --- | --- | --- |
| * 53 | 3476 | 16 | 3 |
| * 54 | 3454 | 54 | 2 |
| 55 | 3421 | 50 | 26 |
| * 56 | 3479 | 18 | 2 |
| * 57 | 3326 | 53 | 4 |
| 58 | 3367 | 57 | 18 |
| * 59 | 3388 | 22 | 2 |
| * 60 | 3339 | 51 | 4 |
| 61 | 3389 | 54 | 25 |
| * 62 | 3405 | 19 | 5 |
| * 63 | 3257 | 48 | 3 |
| 64 | 3230 | 48 | 19 |
| * 65 | 3377 | 21 | 4 |
| * 66 | 3193 | 44 | 3 |
| 67 | 3217 | 50 | 19 |
| * 68 | 3219 | 19 | 4 |

A Ca content lower than about 0.03 parts by mole, as demonstrated by the sample of number 18, led to an MTTF shorter than about 30 hours and an STTF shorter than about 10 hours. A Ca content higher than about 0.15 parts by mole, as demonstrated by the sample of number 22, resulted in a relative permittivity of less than about 3000.

A Mg content lower than about 0.01 parts by mole, as demonstrated by the sample of number 2, led to an MTTF shorter than about 30 hours and an STTF shorter than about 10 hours. A Mg content higher than about 0.09 parts by mole, as demonstrated by the sample of number 6, resulted in a relative permittivity of less than about 3000.

An R content lower than about 2.5 parts by mole, as demonstrated by the sample of number 7, led to an MTTF shorter than about 30 hours and an STTF shorter than about 10 hours. An R content higher than about 8.4 parts by mole, as demonstrated by the sample of number 12, resulted in a relative permittivity of less than about 3000.

A Zr content lower than about 0.05 parts by mole, as demonstrated by the sample of number 13, led to a relative permittivity of less than about 3000. A Zr content higher than about 3.00 parts by mole, as demonstrated by the sample of number 17, resulted in a relative permittivity of less than about 3000.

A Si content lower than about 0.5 parts by mole, as demonstrated by the sample of number 23, led to an STTF shorter than about 10 hours. A Si content higher than about 4.0 parts by mole, as demonstrated by the sample of number 27, resulted in an MTTF shorter than about 30 hours and an STTF shorter than about 10 hours.

A P content lower than about 0.005 parts by mole, as demonstrated by the sample of number 28, led to an STTF shorter than about 10 hours. A P content higher than about 0.500 parts by mole, as demonstrated by the sample of number 38, resulted in an MTTF shorter than about 30 hours and an STTF shorter than about 10 hours.

As demonstrated by the samples of numbers 1, 3 to 5, 8 to 11, 14 to 16, 19 to 21, 24 to 26, and 29 to 37, multilayer ceramic capacitors according to preferred embodiments of the present invention, by contrast, were found to have high relative permittivity combined with long high-temperature operating life because the amounts of ingredients in the formulation composition of the ceramic feedstock used to make their dielectric layers were such that the numbers of parts by mole of elements when the Ti content was defined as 100 parts by mole were, for example, as follows: Ca, about 0.03 parts by mole or more and about 0.15 parts by mole or less; Mg, about 0.01 parts by mole or more and about 0.09 parts by mole or less; R, about 2.5 parts by mole or more and about 8.4 parts by mole or less; Zr, about 0.05 parts by mole or more and about 3.00 parts by mole or less; Si, about 0.5 parts by mole or more and about 4.0 parts by mole or less; and P, about 0.005 parts by mole or more and about 0.500 parts by mole or less.

As demonstrated by the samples of numbers 10 and 11 in particular, furthermore, it was found that the high-temperature operating life improves to about 50 hours or longer if, regarding the amounts of ingredients in the formulation composition of the ceramic feedstock used to make the dielectric layers, the amount of R when the Ti content is defined as 100 parts by mole is about 5.7 parts by mole or more and about 8.4 parts by mole or less.

As demonstrated by the samples of numbers 40, 43, 46, 49, 52, 55, 58, 61, 64, and 67, moreover, the results were still good even if R in the $R_2O_3$ was Y, La, Sm, Eu, Gd, Tb, Ho, Er, Tm, or Yb, not Dy.

In addition, as demonstrated by the samples of numbers 34 to 37 in particular, it was found that the STTF improves to about 15 hours or longer if, for the amounts of ingredients in the formulation composition of the ceramic feedstock used to make the dielectric layers, the amount of P when the Ti content is defined as 100 parts by mole is about 0.21 parts by mole or more and about 0.50 parts by mole or less.

It should be noted that the present invention is not limited to the foregoing preferred embodiments, and numerous variations are possible within the scope of the gist thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for producing a multilayer ceramic capacitor including a multilayer body including a stack of a plurality of dielectric layers, a plurality of inner-electrode layers in the multilayer body, alternating with the dielectric layers, and a pair of outer electrodes on a surface of the multilayer body, and electrically coupled to a portion of the inner-electrode layers exposed on the surface of the multilayer body, the method comprising:

preparing a base powder primarily including a perovskite compound containing Ba and Ti;

preparing a Ca compound, a Mg compound, and a compound of R as sources of minor ingredients Ca, Mg, and R, respectively;

obtaining a mixed powder and then a ceramic slurry by mixing the base powder with the Ca compound as a source of Ca, the Mg compound as a source of Mg, and the compound of R as a source of R;

forming dielectric layers from the ceramic slurry into dielectric sheets;

obtaining an unfired multilayer body by stacking the dielectric sheets, a subset of the dielectric sheets including an applied electrically conductive paste for inner electrodes thereon; and obtaining the multilayer body by firing the unfired multilayer body; wherein the R includes at least one of Y, La, Sm, Eu, Gd, Tb, Dy, Ho, Er, Tm, or Yb; and when a Ti content of the elements is defined as 100 parts by mole, relative amounts of elements are as follows:

Ca, about 0.03 parts by mole or more and about 0.15 parts by mole or less;

Mg, about 0.01 parts by mole or more and about 0.09 parts by mole or less;

R, about 2.5 parts by mole or more and about 8.4 parts by mole or less;

Zr, about 0.05 parts by mole or more and about 3.00 parts by mole or less;

Si, about 0.5 parts by mole or more and about 4.0 parts by mole or less; and

P, about 0.210 parts by mole or more and less than 0.500 parts by mole.

2. The method for producing a multilayer ceramic capacitor according to claim 1, wherein the relative amount of the R is about 5.7 parts by mole or more and about 8.4 parts by mole or less.

* * * * *